US007818959B2

(12) United States Patent
Hu et al.

(10) Patent No.: US 7,818,959 B2
(45) Date of Patent: Oct. 26, 2010

(54) CLEAN POWER SYSTEM

(75) Inventors: Haoran Hu, Novi, MI (US); Thomas Stover, Milford, MI (US); Timothy J. Morscheck, Portage, MI (US); Kathryn A. Miles, Freemont, IN (US); Patrick M. Watts, Gastonia, NC (US); Diane C. Wiersma, Caledonia, MI (US)

(73) Assignee: Eaton Corporation, Cleveland, OH (US)

( * ) Notice: Subject to any disclaimer, the term of this patent is extended or adjusted under 35 U.S.C. 154(b) by 1237 days.

(21) Appl. No.: 10/944,024

(22) Filed: Sep. 17, 2004

(65) Prior Publication Data
US 2006/0059892 A1 Mar. 23, 2006

(51) Int. Cl.
F01N 3/00 (2006.01)

(52) U.S. Cl. .............................. 60/274; 60/275; 60/278; 60/287; 429/12; 429/19

(58) Field of Classification Search ................... 60/275, 60/278, 287, 288, 289, 274; 123/2, 3; 429/12, 429/17, 19
See application file for complete search history.

(56) References Cited

U.S. PATENT DOCUMENTS

| 4,098,960 | A | * | 7/1978 | Gagnon ........................ 429/25 |
| 4,108,114 | A | | 8/1978 | Kosaka et al. |
| 5,339,634 | A | | 8/1994 | Gale et al. |
| 5,678,647 | A | | 10/1997 | Wolfe et al. |
| 5,858,568 | A | | 1/1999 | Hsu et al. |
| 5,890,360 | A | | 4/1999 | Sasaki et al. |
| 5,950,752 | A | | 9/1999 | Lyons |
| 6,051,123 | A | | 4/2000 | Joshi et al. |
| 6,055,968 | A | * | 5/2000 | Sasaki et al. ............ 123/568.21 |
| 6,124,054 | A | | 9/2000 | Gorman et al. |
| 6,213,234 | B1 | | 4/2001 | Rosen et al. |
| 6,230,494 | B1 | | 5/2001 | Botti et al. |
| 6,276,473 | B1 | | 8/2001 | Zur Megede |
| 6,365,290 | B1 | | 4/2002 | Ghezel-Ayagh et al. |
| 6,502,533 | B1 | | 1/2003 | Meacham |
| 6,609,582 | B1 | | 8/2003 | Botti et al. |
| 6,655,130 | B1 | | 12/2003 | Kirwan et al. |
| 6,655,325 | B1 | | 12/2003 | Botti et al. |

(Continued)

OTHER PUBLICATIONS

Goddard III, et al. "Enhanced Power Stability for Proton Conducting Solid Oxide Fuel Cells", 2003 Fuel Cell Annual Report.

(Continued)

Primary Examiner—Tu M Nguyen
(74) Attorney, Agent, or Firm—Paul V. Keller, PLC

(57) ABSTRACT

One aspect of the invention relates to a power generation system that has an internal combustion engine that operates in a low temperature combustion mode to produce an engine exhaust that is low in NOx and particulate matter. The exhaust is treated by a fuel cell to remove organic compounds and CO while producing useful power. Another aspect of the invention relates to controlling the adiabatic flame temperature by EGR drawing from upstream of the fuel cell. A further aspect of the invention relates to treating engine exhaust with a reducing catalyst and then with a fuel cell. A still further aspect of the invention relates to treating exhaust with an intermediate temperature solid oxide fuel cell. A further aspect of the invention relates to a system equipped with a valve allowing exhaust to selectively bypass a fuel cell.

17 Claims, 1 Drawing Sheet

U.S. PATENT DOCUMENTS

| | | |
|---|---|---|
| 6,763,799 B2 | 7/2004 | Ito et al. |
| 6,874,314 B2 * | 4/2005 | Tachtler et al. ............... 60/284 |
| 6,994,930 B1 * | 2/2006 | Geisbrecht et al. ............ 429/19 |
| 7,101,531 B2 * | 9/2006 | Kamijo ...................... 423/650 |
| 7,213,397 B2 * | 5/2007 | Hu et al. ...................... 60/295 |
| 7,246,485 B2 | 7/2007 | Ohki et al. |
| 7,648,785 B2 * | 1/2010 | Hu et al. ...................... 429/17 |
| 2002/0148221 A1 | 10/2002 | Jagtoyen et al. |
| 2003/0141122 A1 | 7/2003 | Boll et al. |
| 2004/0055586 A1 | 3/2004 | Botti et al. |
| 2004/0062968 A1 | 4/2004 | Tanner |
| 2004/0177607 A1 | 9/2004 | Suzuki et al. |
| 2005/0022450 A1 | 2/2005 | Tan et al. |
| 2006/0063046 A1 * | 3/2006 | Hu et al. ...................... 429/17 |
| 2007/0186537 A1 * | 8/2007 | Elwart et al. ................. 60/285 |

OTHER PUBLICATIONS

Sasaki et al., *Mechanism of the Smokeless Rich Diesel Combustion by Reducing Temperature*, SAE 2001-01-0655 (2001).

File history of copending companion case U.S. Appl. No. 10/943,477, filed Sep. 17, 2004 (same as this one), same inventors (Hu et al.), similar specification, and related claims.

* cited by examiner

CLEAN POWER SYSTEM

FIELD OF THE INVENTION

The present invention relates to power generation systems generally, and to low-emission diesel-fueled systems in particular.

BACKGROUND OF THE INVENTION $NO_x$ emissions from vehicles with internal combustion engines are an environmental problem recognized worldwide. Several countries, including the United States, have long had regulations pending that will limit $NO_x$ emissions from vehicles. Manufacturers and researchers have put considerable effort toward meeting that regulation. $NO_x$ emissions can be controlled in conventional gasoline powered vehicles, which use stoichiometric fuel-air mixtures, by three-way catalysts. In the absence of oxygen, three-way catalysts reduce NOx by reaction with CO and unburned hydrocarbons. In diesel powered vehicles and lean-burn gasoline engines, however, the exhaust is too oxygen-rich for three-way catalysts to be effective.

Several solutions have been proposed for controlling NOx emissions in diesel-powered vehicles. One set of approaches focuses on the engine. NOx is generated primarily at high temperatures. By limiting the adiabatic flame temperature, through exhaust gas recirculation (EGR) for example, NOx production can be reduced. Lowering the adiabatic flame temperature to eliminate NOx production, however, causes engine efficiency to decrease and smoke to appear in the exhaust. It is commonly believed that there is a trade-off between NOx production and particulate matter production in diesel engines. It is less well known that if the adiabatic flame temperature is dropped sufficiently, particulate matter production will also decrease. In any event, clean combustion cannot be achieved solely by varying the adiabatic flame temperature at which a diesel engine operates.

One way to reduce total combustion byproducts is to homogenize fuel air mixtures in diesel engines. This can be accomplished by mixing fuel with air prior to injection or injecting all or part of the fuel into an engine cylinder before or early in a compression stroke. While studies show a reduction in emissions, this approach has not been proven commercially and does not eliminate diesel combustion byproducts altogether.

Another set of approaches remove NOx from the vehicle exhaust. These include the use of lean-burn $NO_X$ catalysts, $NO_X$ adsorber-catalysts, and selective catalytic reduction (SCR). Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiency with lean-burn catalysts is unacceptably low.

NOx adsorber-catalysts alternately adsorb NOx and catalytically reduce it. The adsorber can be taken offline during regeneration and a reducing atmosphere provided. The adsorbant is generally an alkaline earth oxide adsorbant, such as $BaCO_3$ and the catalyst can be a precious metal, such as Ru.

SCR involves using ammonia as the reductant. The NOx can be temporarily stored in an adsorbant or ammonia can be fed continuously into the exhaust. SCR can achieve NOx reductions in excess of 90%, however, there is concern over the lack of infrastructure for distributing ammonia or a suitable precursor. SCR also raises concerns relating to the possible release of ammonia into the environment.

An alternative approach to reducing emissions is to convert the chemical energy of the fuel into electrical energy using a fuel cell. Fuel cells are not very effective at extracting power from long chain hydrocarbons, but fuel reformers can be used to break long chain hydrocarbons into smaller more reactive molecules such as short chain hydrocarbons, oxygenated hydrocarbons, hydrogen, and carbon monoxide, which are suitable fuels for a fuel cell. For example, U.S. Pat. No. 5,678,647 suggests powering a fuel cell for a vehicle drive system using a conventional fuel processed through a reformer. The reformer and the fuel cell must be heated before they are operative to produce useful power.

U.S. Pat. No. 6,276,473 describes a hybrid power generation system comprising an engine, a fuel reformer, and a fuel cell. The engine is used to provide cold start-power and the engine's exhaust is used to heat the fuel reformer and the fuel cell. When the reformer and fuel cell reach their operating temperatures, the reformer/fuel cell system begins to produce power. The engine can continue to operate after warm-up or be turned off.

U.S. Pat. No. 6,655,325 describes a power generation system comprising an internal combustion engine and a fuel cell. The engine can operate as a reformer and provides fuel for the fuel cell. The engine can also provide shaft power, or alternatively all the shaft power can be derived from the fuel cell. Particulate matter in the engine exhaust is said to be removed by the fuel cell and a catalytic converter. It is also suggested that by treating the fuel cell exhaust with a catalytic converter, near zero emissions of hydrocarbons and nitric oxide can be achieved.

In spite of progress, there remains a long felt need for environmentally friendly, efficient, and reliable power generation systems for vehicles.

SUMMARY OF THE INVENTION

The following presents a simplified summary in order to provide a basic understanding of some aspects of the invention. This summary is not an extensive overview of the invention. The primary purpose of this summary is to present some concepts of the invention in a simplified form as a prelude to the more detailed description that is presented later.

The present invention relates to vehicle power generation systems that use fuel cells to reduce emissions. One aspect of the invention relates to a power generation system designed to meet a government-mandated vehicle emission standard. According to this aspect of the invention, an internal combustion engine is configured to operate in a manner whereby the engine exhaust meets NOx and particulate matter (PM) emission limits without further treatment. For example, an engine can be operated with an adiabatic flame temperature limited whereby the engine exhaust contains no more than about 0.4 g/bhp-hr NOx and no more than about 0.04 g/bhp-hr PM. Another aspect of the invention relates to controlling the adiabatic flame temperature using external exhaust gas recirculation (EGR) drawing exhaust from upstream of the fuel cell.

The fuel cell removes organic compound and CO from the exhaust, while at the same time generating useful power. If necessary, the exhaust is further treated by an oxidation catalyst to meet any organic compound and CO emission limits. For example, the fuel cell and the optional catalytic converter can treat the exhaust to limit non-methane hydrocarbons (NMHC) to no more than about 0.28 g/bhp-hr.

According to a further aspect of the invention, engine exhaust is first treated by a reducing catalyst to remove NOx and then by a fuel cell to remove CO and/or organic compounds. By placing the reducing catalyst upstream of the fuel cell, high concentrations of CO and/or organic compounds can be used to facilitate NOx removal.

A further aspect of the invention relates to a power generation system in which an intermediate temperature solid oxide fuel cell is used to treat engine exhaust. An intermediate temperature solid oxide fuel cell (ITSOFC) is operative at a temperature in the range from about 250 to about 600° C. Preferably, the fuel cell is operative to treat the engine exhaust without having to heat the exhaust before it enters the fuel cell. An ITSOFC offers advantages over an SOFC when the fuel cell is designed for exhaust clean up rather than as a primary power source.

A further aspect of the invention relates to a power generation system equipped with a bypass valve to allow the exhaust to selectively bypass the fuel cell. A bypass option for the fuel cell can be valuable during high engine load conditions or when the fuel cell is cold. The bypass can be configured to heat the fuel cell.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
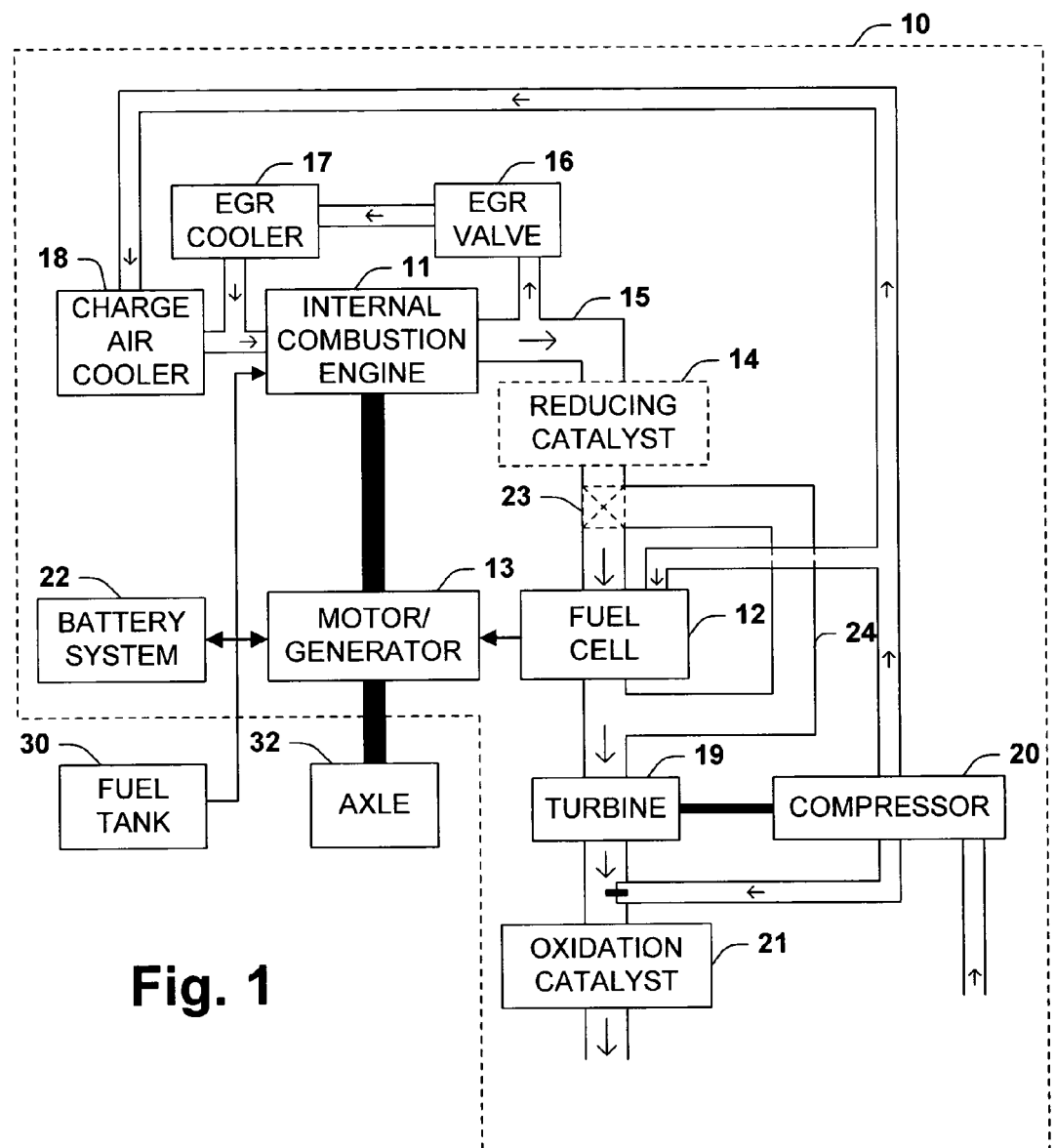
FIG. 1 is a schematic illustration of a power generation system exemplifying several aspects of the present invention.

FIG. 1 is a schematic illustration of a power generation system 10 exemplifying several aspects of the present invention. The power generation system 10 comprises an internal combustion engine 11, a fuel cell 12, and a motor/generator 13. The power generation system 10 is designed to couple with a fuel tank 30 and a vehicle axle 32.

The internal combustion engine 11 can be any type of internal combustion engine. A suitable engine can be, for example, a compression ignition engine or a spark ignition engine. The engine 11 can be designed for any particular type or types of hydrocarbon or oxygenated hydrocarbon fuel, including for example diesel, gasoline, natural gas, or methanol.

In one embodiment, the internal combustion engine 11 is operated in a manner that limits the NOx and particulate matter content of the exhaust. Any suitable method of operation can be used, depending on the particular limits. For example, some limits on NOx and particulate matter can be met by configuring the engine 11 to operate as a homogenous charge compression ignition (HCCI) diesel engine.

In a preferred embodiment, the engine 11 is configured to operate in a low temperature combustion mode. Low temperature combustion mode refers to engine operation with an adiabatic flame temperature sufficiently low that the engine exhaust contains little $NO_x$ and little particulate matter. The fuel-air mixture can be heterogeneous, as in a diesel engine where fuel is injected directly into cylinders after air compression. The fuel-to-air ratio can be anywhere in the range from lean to rich, except to the extent the fuel-to-air ratio is used to control the adiabatic flame temperature.

In the context of low temperature combustion mode, the adiabatic flame temperature refers to the highest local adiabatic flame temperature that can occur in an engine cylinder. For pre-mixed combustion, the adiabatic flame temperature is based on the entire fuel-air charge. For heterogeneous combustion, the adiabatic flame temperature is based on the fuel combined with a stoichiometric amount of air. The adiabatic flame temperature for low temperature combustion mode is generally about 2000 K or less, preferably about 1900 K or less, more preferably about 1800 K or less.

By sufficiently lowering the adiabatic flame temperature, the exhaust can meet virtually any limits on $NO_x$ and PM production. Preferably, the adiabatic flame temperature is limited whereby the exhaust contains no more than about 0.4 g/bhp-hr NOx, more preferably no more than about 0.2 g/bhp-hr NOx. Preferably, the exhaust contains no more than about 0.04 g/bhp-hr particulate matter (PM), more preferably no more than about 0.01 g/bhp-hr particulate matter.

The adiabatic flame temperature is generally limited by exhaust gas recirculation (EGR). The power generation system 10 has an external EGR loop selectively drawing exhaust from conduit 15 through EGR valve 16 and EGR cooler 17 to combine with charge air for the engine 11. This is an example of a high pressure external EGR loop in that recirculated exhaust is drawn from a high-pressure portion of the exhaust system, whereby the exhaust can flow to an intake of the engine 11 without being pressurized by a compressor. High-pressure exhaust can also be found downstream of the fuel cell 12 and an EGR stream can also be drawn from that location.

In a preferred embodiment, an external EGR system draws from upstream of the fuel cell. Drawing EGR from downstream of the fuel cell 12 provides a cleaner recirculation stream and results in the production of more fuel for the fuel cell 12. Drawing EGR from upstream of the fuel cell 12, however, reduces the volume of flow and quantity of pollutants that must be processed by the fuel cell 12.

Instead of high pressure EGR, the engine 11 can use low pressure EGR. Low pressure EGR involves moving the recirculated exhaust through a compressor. In conventional systems, low pressure EGR generally requires a catalytic particulate filter to prevent fouling of the compressor. In the low temperature combustion mode, however, the exhaust is generally sufficiently low in particulates that a particulate filter is unnecessary. Low pressure EGR can draw exhaust from any part of the exhaust system, including for example, a relatively cool low pressure location such as downstream of the turbine 18 in the power generation system 10. Low pressure EGR has the advantage of being useable regardless of engine operating conditions, as opposed to high pressure EGR which can only be used at torque/speed conditions where there is a suitable pressure differential between the exhaust manifold and the engine intake.

A further EGR method that can be used instead of, or in addition to, the foregoing methods is internal EGR. Internal EGR is achieved through valve timing. In one mode of internal EGR, an exhaust valve closes before a cylinder empties on its exhaust stroke. In another mode, an exhaust valve opens during an intake stroke to draw exhaust from the exhaust manifold. In a further mode, an intake valve is opened during an exhaust stroke, whereby exhaust flows to the intake manifold. This later mode can result in undesirable heating of the intake manifold. To mitigate this, it is preferred that a heat exchanger be provided within the intake manifold if intake-side internal EGR is used. In such a case, the manifold is preferably designed with sufficient volume to retain the internally recirculated exhaust. Internal EGR is generally used selectively with variable valve timing, however, it can be set as a permanent timing feature particularly when the power generation system 10 is designed to operate the engine 11 at constant speed.

An engine operating in low temperature combustion mode produces CO and unburned organic compounds. A low temperature combustion mode diesel engine in particular will exhaust substantial quantities of CO and unburned organic compounds. While some of the exhaust may be diverted for EGR, or possibly to a fuel reformer, the bulk of the exhaust is channeled by conduits 15 to the fuel side of the fuel cell 12. The conduit 15 comprises one or more manifolds and/or pipes.

If the adiabatic temperature is lowered sufficiently, to about 1500 K for example, the engine 11 operates as a fuel reformer. This may be advantageous in that the fuel cell 12 can have a higher theoretical efficiency than the engine 11. While running the engine 11 as a fuel reformer is an option for at least some embodiments of the present invention, it is preferred that the adiabatic flame temperature be higher and that the design of the system be oriented toward using the fuel cell 12 to achieve clean exhaust rather than toward making the fuel cell 12 the primary power source.

Within the fuel cell 12, CO and organic compounds are oxidized to water and $CO_2$ while producing useful power. The CO and unburned organic compound concentrations in the exhaust are preferably reduced substantially. In one embodiment, the fuel cell 12 removes at least about 50% of the CO in the exhaust. In another embodiment, the fuel cell removes at least about 80% of the CO. In a further embodiment, the fuel cell removes at least about 90% of the CO. Unburned organic compounds can also be removed in the foregoing percentages.

The fuel cell 12 can comprise any type of fuel cell. The fuel cell type can be, for example, a solid oxide fuel cell (SOFC), a molten carbonate fuel cell (MCFC), or a phosphoric acid fuel cell (PAFC). The term fuel cell as used herein is inclusive of devices comprising multiple individual fuel cells connected in parallel or in series. A preferred fuel cell is a intermediate temperature solid oxide fuel cell. It can have any suitable structure. Suitable structures include, for example, tubular or a planar structure.

A fuel cell according to the invention can produce a significant amount of power during steady operation. The phrase a "significant amount of power during steady operation" is used herein to distinguish fuel cells that serve only as sensors, providing little useful power beyond what is required for their own operation.

Solid oxide fuel cells are generally characterized in terms of their electrolytes. Any suitable electrolyte can be used. Examples of electrolytes include stabilized zirconium, such as $Y_2O_3$ stabilized $ZrO_2$; ceria-based oxides, chlorides, and fluorides, such as gadolinium doped $CeO_2$; alumina electrolytes, such as chloride, fluoride, or sodium doped alumina; lanthanum electrolytes, such as strontium doped lanthanum, maganite and lanthanum gallate; and doped bismuth oxides, such as bismuth vanadium cobalt oxide.

The anodes and cathodes can be of any suitable type. Suitable electrodes have low thermal mismatch with the electrolyte material. The cathode is electrically conductive, reacts with oxygen to form oxygen ions, and allows the ions to pass through to the electrolyte. Depending on the electrolyte, a suitable cathode material could be a porous lanthanum strontium maganite, a lanthanum strontium ferrite or lanthanum strontium cobalt ferrite. The anode is also electrically conductive and allows the passage of oxygen ions. A suitable anode material could be nickel. These exemplary anode and cathode material are commonly mixed with the electrolyte material, as this generally gives better performance.

A preferred fuel cell is an intermediate temperature solid oxide fuel cell (ITSOFC). An intermediate temperature solid oxide fuel cell is a fuel cell operative within the range from about 250 to about 600° C., more preferably operable at least one temperature within the range from about 400 to about 550° C. Being operative at a temperature means that the fuel cell can operate at that temperature with a substantial efficiency, in terms of energy production from at least CO, over a substantial period. Examples of ITSOFCs include proton-conducting perovskites such as $BaZrO_3$, $BaCeO_3$, and $SrCeO_3$. A typical operating range for this type of fuel cell is from about 400 to about 700° C.

Preferably, the fuel cell 12 operates near the same temperature as the exhaust leaving the internal combustion engine 11. Moreover, it is preferred that the exhaust be a relatively low temperature exhaust, such as produced by a diesel engine. Preferably, the exhaust can be supplied to the fuel cell 12 without heating between the engine 11 and the fuel cell 12. Preferably, the fuel cell 12 operates at a temperature within about 100° C. of the exhaust temperature, more preferably within about 50° C. Preferably, the engine exhaust can be used to heat the fuel cell 12 to its operating temperature.

Optionally, the fuel cell 12 can be configured to operate independently of the engine 11. In such a case, the fuel cell 12 requires a fuel source separate from the exhaust. A separate fuel source could be gasoline, diesel, or reformed fuel. Gasoline or diesel can be reformed in the fuel cell 12 itself when it is operating at a temperature of about 600 to 650° C. or higher. The reforming process can produce sufficient heat to sustain the fuel cell temperature.

In addition to a fuel source, in this case exhaust, the fuel cell 12 requires a source of oxygen. This source can be air, or a more concentrated form of oxygen. In one embodiment, the concentration of oxygen is increased by pressurizing air. In another embodiment, the concentration of oxygen is increased by separating oxygen from air. A suitable process for separating oxygen from air can be a membrane separation process or an adsorptive separation, for example. These two embodiments can be combined, providing pressurized oxygen to the fuel cell 12, although care must be taken to mitigate any risk of explosion.

In the power generation system 10, a turbine 19 recovers energy from the exhaust. The turbine 19 can, for example, drive a compressor 20 to provide turbo-charging for the engine 11. The compressed air charged to the engine 11 can first be cooled in a charge air cooler 18. Compressed air can also be provided to the fuel cell 12.

Ideally, the fuel cell 12 removes sufficient amounts of CO and hydrocarbons to meet emission regulations, but optionally, an oxidation catalyst 21 can be used to further reduce the concentrations of these species. The oxidation catalyst 21 can be a three-way catalyst such as used in automobile exhaust systems. A three-way catalyst oxidizes unburned hydrocarbons and CO, while reducing NO. In a preferred embodiment, however, the exhaust has very little NOx and the oxidation catalyst 21 need only provide oxidation. A suitable oxidation catalyst is a precious metal, such as platinum.

Where an oxidation catalyst 21 is used, oxygen must be available in the exhaust. Oxygen will be available if the engine 11 is run lean. If the engine 11 is not run lean, an oxygen-containing gas can be injected into the exhaust. As illustrated in FIG. 1, a compressor 20, which provides compressed air for the engine 11, can also provide air for injection into the exhaust of the fuel cell 12.

By increasing the size of the fuel cell 12, or using the fuel cell 12 with a sufficiently large oxidation catalyst 21, the exhaust can be treated to meet virtually any limit on CO production or the production of an organic compound group. An organic compound group can be total unburned hydrocarbons and oxygenated hydrocarbons, non-methane organic gases (NMOG), non-methane hydrocarbons (NMHC), or formaldehyde, for example. Preferably, the treated exhaust contains no more than about 4.0 g/bhp-hr CO, more preferably no more than about 2.0 g/bhp-hr CO. Preferably the treated exhaust contains no more than about 0.28 g/bhp-hr NMOG, more preferably no more than about 0.14 g/bhp-hr.

With regard to designing a system to meet particular emission standards, it is noted that some standards are expressed in terms of g/ml based on a particular test protocol. The factor, CF, for converting from g/bhp-hr to g/ml is given by the formula:

$$CF = \rho/BSFC * FE$$

where $\rho$ is the fuel density in lb/gal, BSFC is the brake-specific fuel consumption in lb/bhp-hr, and FE is the fuel economy in mi/gal. Typical conversion factors for gasoline-powered passenger cars are around 0.6, whereas typical conversion factors for diesel-powered buses and trucks are in the range from about 2 to about 4.

In another aspect of the invention, the engine 11 produces NOx, which is removed by a reducing catalyst 14 located between the engine 11 and the fuel cell 12. Preferably the engine 11 is run in a mode that produces little or no particulate matter. On the other hand, the engine 11 can be allowed to produce significant amounts of CO and unburned hydrocarbons. Preferably, the concentration of one or more of these species is high in comparison to the NOx concentration, whereby there is an excess of reductant available for reducing NOx over the reducing catalyst 14. The engine 11 is preferably operated with a stoichiometric or rich fuel-to-air ratio, whereby the exhaust is low in oxygen, which can interfere with the reducing reactions.

The reducing catalyst 14 can be any catalyst that reduces NOx by reaction with one or more exhaust gas constituents selected from the group consisting of $H_2$, CO, and hydrocarbons. A three-way catalyst, such as commonly used in passenger vehicle exhaust systems can be used, or a catalyst proposed for use in regenerating a nitrogen trap. The catalyst can be, for example, one or more precious metals, such as Au, Ag, and Cu, group VIII metals, such as Pt, Pd, Ru, Ni, and Co, Cr, Mo, or K. The reducing catalyst 14 can also include an NOx adsorbant, although this is not generally necessary. The catalyst can be a lean-NOx catalyst, provided a satisfactory catalyst can be found for a particular application.

An advantage of placing a reducing catalyst 14 between the engine 11 and the fuel cell 12 is that ample reducing agent can be provided to the reducing catalyst 14 without incurring a fuel penalty. Excess reducing agent can be used by the fuel cell 12 in energy production, potentially with even higher efficiency than if that same fuel were provided to the engine 11. With respect to a diesel power generation system, the engine does not have to be run lean, because the usual consequences of lean operation—high emissions and low efficiency—can be eliminated by the fuel cell 12. Even with respect to gasoline powered systems there is an advantage in that excess reductant can be provided without a fuel penalty. An excess of reductant improves the reduction efficiency of a reducing catalyst, decreasing its required size, cost, and warm-up time.

Where NOx is removed by a reducing catalyst 14, PM production can be limited in any suitable manner. For example, in a conventional diesel engine, PM production can be limited by increasing the adiabatic flame temperature. PM production can also be reduced by homogenizing all or part of a fuel-air charge. Preferably, the exhaust contains no more than about 0.04 g/bhp-hr PM, more preferably no more than about 0.01 g/bhp-hr particulate matter.

The power generation system 10 provides shaft power to the axle 32 through both the engine 11 and the motor generator 13. Variable power demands can be met entirely, or in part, by a battery system 22. The battery system 22 can be charging when shaft power demands on the power generation system 10 are below the energy production rate. Energy for battery storage can be drawn directly from the fuel cell 12 or from the motor/generator 13. A motor/generator is an electric motor that can be run in reverse to act as a generator. Preferably, the motor/generator 13 can draw power for storage from either the engine 11 or the axle 32. Drawing power from the axle 32 slows the vehicle and is a form of regenerative braking. The motor/generator 13 can be linked with gears to vary the distribution of power from the engine 11 between the axle 32 and motor/generator 13.

The battery system 22 comprises one or more batteries. Preferably, the battery system 22 has a large storage capacity and peak output, whereby the energy provided by the battery system 22 can be comparable to the total output of the power generation system 10 for a period of about 15 minutes or more, more preferably half an hour or more.

Preferably, the power generation system 10 is adapted to provide power and low emissions on start-up. One method of cold start operation is to pre-heat the fuel cell 12 and/or the oxidation catalyst 21 before starting the engine 11. This would take about 30 seconds. During this time, the system can provide shaft power through motor/generator 13 if the battery system 22 has sufficient capacity.

Another method of cold start operation is to run the engine 11 in a conventional mode during warm-up. A higher level of NOx and PM production can be tolerated during warm-up if the average NOx and PM production levels meet regulations. The power generation system 10 includes a bypass valve 23 for bypassing the fuel cell 12 during warm-up. Bypassing the fuel cell 12 prevents fouling of the fuel cell 12 while the engine 11 is producing a high concentration of particulate matter. If desired, the engine exhaust can still be used to heat the fuel cell 12 during bypass mode by providing heat exchange between the bypass conduit 24 and the fuel cell 12.

The bypass valve 23 can have other purposes. Generally, it is valuable to make fuel-saving and exhaust clean-up devices transparent to the user. In certain configurations, for example when the fuel cell 12 is large to provide a high degree of exhaust clean up, the fuel cell 12 can exert significant backpressure on the engine 11. This backpressure could be noticeable during periods of high power demand. The bypass valve 23 can be used to relieve this backpressure during periods where it might otherwise be noticeable.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

The invention claimed is:

1. A method of powering a diesel-fueled vehicle that meets government mandated emission limits throughout periods of varying power demand, including periods of high power demand, comprising:
   operating a diesel-fueled internal combustion engine to drive an axle and produce an exhaust comprising CO;
   processing the exhaust through a fuel cell that removes at least 50% of the CO from the exhaust and produces electric power from the exhaust;
   using the electric power to energize an electric motor that also drives the axle;
   wherein the government mandated emission limits are United States government-mandated emission limits, the meeting of which limits requires the vehicle to emit less than 0.4 g/bhp-hr $NO_X$ and less than 0.04 g/bhp-hr PM;
   throughout the periods the engine is operated in a low temperature combustion mode whereby the engine exhaust meet those limits with regard to $NO_X$ and PM emissions without exhaust aftertreatment; and
   the low temperature combustion mode is characterized by heterogeneous combustion of the diesel fuel with compressed air within the engine's cylinders with sufficiently large quantity of re-circulated exhaust gas such that the fuel combusts at sufficiently low temperatures that the engine produces an exhaust containing substantial quantities of hydrocarbons and CO but no more than about 0.4 g/bhp-hr $NO_X$ and no more than about 0.04 g/bhp-hr particulate matter (PM) without further treatment.

2. The method of claim 1, wherein the fuel cell temperature remains below about 700° C. throughout the periods.

3. The method of claim 1, wherein the fuel cell temperature remains no more than 100° C. above the temperature of the exhaust leaving the engine throughout the periods.

4. The method of claim 1, wherein the engine is operated at stoichiometric to rich fuel-to-air ratios through the periods.

5. The method of claim 1, further comprising operating an exhaust bypass to prevent the fuel cell from treating the exhaust while the fuel cell is warming.

6. The method of claim 1, wherein the engine acts as the vehicle's primary power source.

7. The method of claim 1, wherein the fuel cell is an intermediate temperature solid oxide fuel cell (ITSOFC) that operates at temperatures in the range from 250 to about 600° C.

8. The method of claim 7, wherein the fuel cell operates at temperatures in the range from 400 to 550° C.

9. A vehicle comprising:
   an axle;
   a compression ignition diesel engine;
   an electric motor; and
   a fuel cell comprising an air side and a fuel side;
   wherein both the electric motor and the internal combustion engine are configured to drive the axle;
   the internal combustion engine is a diesel-fuel internal combustion engine configured to operate in a low temperature combustion mode characterized by heterogeneous combustion of diesel fuel with compressed air and sufficiently large quantity of re-circulated exhaust gas within the engine's cylinders such that the fuel combusts at sufficiently low temperatures that the engine produces an exhaust containing substantial quantities of hydrocarbons and CO but no more than about 0.4 g/bhp-hr $NO_X$ and no more than about 0.04 g/bhp-hr particulate matter (PM) without further treatment;
   the vehicle is configured to deliver the bulk of the engine exhaust to the fuel side of the fuel cell;
   the fuel cell is configured to treat the exhaust to remove at least 50% of the CO from the exhaust, and to generate a significant amount of power;
   the vehicle meets United States government mandated limits on $NO_X$ and particulate matter emission by means that consist essentially of the engine's being configured to operate in the low temperature combustion mode; and
   the United States government mandated limits require the vehicle to emit less than 0.4 g/bhp-hr NOx and less than 0.04 g/bhp-hr PM.

10. The vehicle of claim 9, wherein the fuel cell is operative at a temperature 100° C. hotter than the exhaust the engine produces when operating in the low temperature combustion mode.

11. The vehicle of claim 9, wherein the low temperature combustion mode is an operating mode consisting of stoichiometric to rich fuel-to-air ratios.

12. The vehicle of claim 9, wherein the vehicle comprises an exhaust bypass configured to keep the exhaust from the fuel side of the fuel cell while the fuel cell is cold.

13. The vehicle of claim 9, wherein the vehicle comprises an exhaust bypass configured to keep the exhaust from the fuel side of the fuel cell while the fuel cell is warming.

14. The vehicle of claim 9, wherein the engine is the vehicle's primary source of power.

15. The vehicle of claim 9, wherein the fuel cell is an intermediate temperature solid oxide fuel cell (ITSOFC) operative at a temperature in the range from 250 to about 600° C.

16. The vehicle of claim 15, wherein the fuel cell is operative at a temperature in the range from 400 to 550° C.

17. The vehicle of claim 15, wherein the fuel cell's operating temperature range is limited to below about 700° C.

* * * * *